United States Patent [19]

Cioca et al.

[11] Patent Number: 4,557,855

[45] Date of Patent: Dec. 10, 1985

[54] SURFACE ACTIVE AGENT COMPOSITIONS

[75] Inventors: Gheorghe Cioca, Coatesville, Pa.; Marcel Siegler, North Bergen, N.J.; Apostol Spiliadis, Frazer, Pa.

[73] Assignee: Seton Company, Newark, N.J.

[21] Appl. No.: 664,301

[22] Filed: Oct. 24, 1984

Related U.S. Application Data

[62] Division of Ser. No. 479,715, Mar. 28, 1983, Pat. No. 4,494,994.

[51] Int. Cl.$^4$ .......................... B01F 17/00; C09K 3/00
[52] U.S. Cl. ...................................... 252/355; 252/182
[58] Field of Search ...................... 252/182, 355, 601; 524/612; 106/308

[56] References Cited

U.S. PATENT DOCUMENTS

| | | | |
|---|---|---|---|
| 3,001,996 | 9/1961 | Mannheimer | 252/355 |
| 3,859,337 | 1/1975 | Herz et al. | 252/601 |
| 3,953,406 | 4/1976 | Marsh, Jr. | 252/182 |
| 4,127,383 | 11/1978 | Johnston et al. | 252/355 |
| 4,263,181 | 4/1981 | Wagner et al. | 524/612 |

*Primary Examiner*—John F. Terapane
*Assistant Examiner*—T. J. Wallen
*Attorney, Agent, or Firm*—Webb, Burden, Robinson & Webb

[57] ABSTRACT

A surface active agent is comprised of lignin sulfonic acids, and optionally, an alkylaryl sulfonic free acid with at least 10 carbon atoms and a polypeptide having a molecular weight of about 2,500 to about 15,000. In addition, a disperse dye composition is provided which includes solid particles of a dye or pigment which have a particle size of less than 2 microns with the surface active agent disposed at the surface of the particles.

6 Claims, No Drawings

SURFACE ACTIVE AGENT COMPOSITIONS

This application is a division, of application Ser. No. 479,715, filed Mar. 28, 1983 now U.S. Pat. No. 4,494,994.

BACKGROUND OF THE INVENTION

1. Field of the Invention

This invention relates to surface active agents, and more particularly, to surface active agents which are useful in dispersing particles in aqueous media or in a media of water and an organic solvent which is a nonsolvent for the particles.

2. Description of the Prior Art

The dispersion of particles in a liquid media, which is a nonsolvent for the particles, typically involves the utilization of a surface active agent. These surface active agents are disposed at the surface of the particles by chemical groups which have an affinity for the particle surface on one end of the molecule and an affinity for the dispersing media at the opposing end of the molecule. Thus, when the particles are sufficiently small in size, a stable homogeneous suspension or dispersion of the particles is produced.

This principle has applications in a plurality of fields wherein solid particles and liquids are to be dispersed in a nonsolvent media. Typical of these fields are paint compositions, insecticides, fungicides, herbicides, ink compositions, emulsion polymers and the like. More particularly, these surface active agents have found use in dispersing dyes and pigments in solvent or aqueous media for dyeing textile fibers, leathers or the like.

In dispersing these dyes, pigments and other particulate solids, it is necessary to reduce the particle size of the solids to 2 microns or less in order that a stable homogeneous dispersion of the particles be formed in the media. Additionally, a sufficient amount of surfactant must be included in the grinding process, i.e. particle reduction, in order to dispose the surface active agent at the surface of the particles for appropriate association therewith to impart stability to such dispersion.

In a typical process for dispersing pigments and dyes, the particulate solids dispersed in a liquid nonsolvent medium are continuously passed through a mill in order that the appropriate particle size be obtained for subsequent utilization in a dyeing process or the like. Subsequent to obtaining the appropriate particle size the dispersion may be dried to 100 percent solids and then redispersed or used in a dyeing process directly. These processes require a great deal of energy consumption for grinding and high concentrations and quantities of dispersing agents, i.e. surface active agents, in order to grind the particles to the appropriate size.

Commercial dye preparations comprise dye or pigment cake, that is, a dye compound which generally contains minor amounts of impurities, a water soluble diluent for standardization purposes such as sodium sulfate, and one or more water soluble surfactants. Due to reactant impurity or the nature of the multistep reactions used in the synthesis of the dye compounds, the color yield or shade from different batches of the dye cake will vary. The dye preparation must therefore be standardized by varying the amount of dye and diluent used in the dye preparation so that the color or strength of the preparation is the equivalent of a sample used as the standard.

Further, in the dyeing process it is necessary to obtain a disperse dye having a particle size of less than 2 microns, and preferably, in the range of 0.3 to about 1.5 microns to obtain a dyed article which is "level." Again, the grinding process to obtain the desired particle size is critical in conjunction with the surface active agent in order to obtain the homogeneous dispersion and level dyeing.

Several surface active agents have been utilized in connection with disperse dyes, pigments and the like solid particulates which are dispersed in a liquid media. Typical surface active agents are lignin sulfonates, sorbitan, fatty acid esters, fatty acid esters of sodium sulfosuccinate, alkane sulfonates, ethoxylated alkylphenols and their sulfonates, ethoxylated amines, amides and their sulfonates and the like.

A great deal of success has been achieved utilizing lignin sulfonates in dispersing dyes. However, even with the lignin sulfonates, high levels of surface active agent and severe grinding conditions are required in order to obtain an acceptable disperse dye. Typically, 60 to 70 parts by weight of a dispersing agent such as sodium lignin sulfonate per 100 parts by weight of the commercial dried disperse dye are required to obtain an acceptable composition. In accordance with the present invention, a surface active agent is provided which is useful in dispersing solids and liquids in a liquid nonsolvent. More particularly, in accordance with the present invention, a surface active agent is provided for dispersing dyes and pigments which can be utilized at a much lower level than that known in the prior art while achieving comparable, if not superior, results.

BRIEF DESCRIPTION OF THE INVENTION

A surface active agent is comprised of lignin sulfonic acids, and optionally, an alkylaryl sulfonic free acid with at least 10 carbon atoms, and a polypeptide having a molecular weight of about 2,500 to about 15,000. In addition, a disperse dye composition is provided which includes solid particles of a dye or pigment which have a particle size of less than 2 microns with the surface active agent disposed at the surface of the particles.

DETAILED DESCRIPTION OF THE INVENTION

The lignin sulfonic acids useful in accordance with the invention are usually made from the lignin of sulfite pulp mill liquors. Lignin is the noncarbohydrate constituent of wood and woody plants and functions as the natural plastic binder for cellulose fibers. Lignin is polymeric in nature and is proposed to be the three-dimensional polymer of coniferyl alcohol or other guaiacylpropane derivatives. Typically, in the pulping process the lignin is separated from the cellulose and sulfonated. These lignin sulfonic acids have a molecular weight range from about 2,000 to 500,000 with a typical degree of sulfonation of about 0.9 mole per 1,000 unit weight of lignin.

The lignin sulfonic acids useful in the practice of the invention can be used as either the sulfonic acids, per se, or in the form of sodium salts thereof. The sodium salt of the lignin sulfonic acids has the following typical properties: pH of about 10 to 11 of a 2 percent aqueous solution; 59.3 dynes/$cm^2$ surface tension of a 1 percent aqueous solution. When the free acid is utilized it is derived from the sodium salt by methods well known to those skilled in the art.

The alkylaryl sulfonic acids in their free acid form useful in the practice of the invention are those having 10 carbon atoms or greater. These alkylaryl sulfonic acids are those which have a sulfonate ($SO_3$ group) attached to an aryl ring and also have a hydrophobic or oleophilic group also attached to the aryl ring. Preferably, the hydrophobic group is an alkyl group having up to 25 carbon atoms. Most preferably, the alkyl group is a straight chain alkyl group in order to provide maximum biodegradability. Most preferably, the alkyl group has up to 12 carbon atoms, and one particularly useful alkylaryl sulfonic acid is dodecylbenzene sulfonic acid. It is to be noted that the alkylaryl sulfonic acid is used only in its free acid form and in addition to the lignin sulfonic acids in the free acid form.

The polypeptides, which have certain surface active agent properties in and of themselves, useful in the practice of the invention are those having a molecular weight between about 2,500 to about 15,000. These polypeptides are typically formed from the hydrolysis of naturally occurring proteins such as collagen or elastin. Additionally, the hydrolysis may be through either enzymatic digestion or through chemical hydrolysis by methods well known to those skilled in the art. The particularly useful polypeptides are those described in U.S. Pat. No. 4,285,486, incorporated herein by reference and made a part hereof. The utilization of polypeptides in conjunction with the organic sulfonic acids forms the basis of the surface active agent in accordance with the invention.

In one aspect of the invention, when the sodium salts of the lignin sulfonic acids are used, the polypeptides homogeneously intermix with the sulfonate to form the surfactant and may be ionically associated therewith to provide a particular orientation of the molecules. In another aspect of the invention, when the organic sulfonic acid is used in the free acid form the sulfonic acids form a sulfonate salt with the free amino groups present in the polypeptide to form a salt.

More particularly, the polypeptide is present at a level of about 4 percent by weight to about 50 percent by weight based on the weight of the surface active agent on a dry solids basis, and the lignin sulfonic acids, and optionally, the alkylaryl sulfonic acid, are present at a level of about 50 percent by weight to about 96 percent by weight based on the weight of the surface active agent on a dry solids basis. When the polypeptide is present at a level of lower than about 4 percent, the surface active agent is insufficient to provide the dispersing improvement hereinafter set forth, while when the organic sulfonic acid is below a level of 50 percent, the wetting characteristics of the surface active agent are deteriorated so as to detract from the dispersing activity of the surface active agent. The ratio of lignin sulfonic acids of alkylaryl sulfonic acid is about 50 to 100 parts by weight to 0.2 to 4 parts by weight.

In another feature of the surface active agent in accordance with the invention, it is preferred that it have a pH of about 6 to about 8. If the pH is below 6 a precipitation of the lignin sulfonic acids can occur, and if the pH is above 8 the salt of the organic sulfonic acid with the amino groups of the polypeptide is destroyed.

When the surface active agent, in accordance with the invention, utilizes the sodium salt of lignin sulfonic acids it is prepared as follows. To an appropriate vessel are charged water, and an aqeuous solution of the polypeptide. Preferably, the aqueous solution is about 20 percent to about 40 percent solids. The pH of the polypeptide solution is adjusted with sodium hydroxide, potassium hydroxide or the like to a pH of about 6 to about 7. The solution is heated to about 65° to 120° C., and preferably, to about 75° to 80° C. over the course of 60 minutes in order to ensure homogeneity and to effect the solubilization of the lignin sulfonate to be subsequently added. The lignin sulfonate is then added incrementally a small amount at a time over the course of about 3 hours while maintaining the temperature at about 65° to 120° C., and preferably, 75° to 80° C. During the course of the addition, small amounts are added, with agitation, with additional amounts being charged as solubilization is readily apparent. The mixing at the elevated temperature is required in order to obtain the appropriate orientation of the binding between the polypeptide molecules and the lignin sulfonate molecules. It has been found that this admixture at elevated temperature is required in order to obtain this orientation. The pH of the surface active agent is 7.5 to 8.

After all the sodium lignin sulfonate has been added and admixed at elevated temperature, it is cooled to room temperature and is ready to be used as a surface active agent for a wide variety of uses.

In another aspect of the invention, when the lignin sulfonic acid, per se, is utilized to form the surfactant, the procedure previously described is generally utilized. To an appropriate vessel are charged the desired amount of water and the aqueous solution of the 20 to 40 percent by weight in water solution of hydrolyzed collagen having a molecular weight of about 2,500 to 15,000. The pH is adjusted to about 6 to 7 and the solution heated to 65° to 120° C., and preferably, 70° to 80° C. The dried ground lignin sulfonic acids are added to the polypeptide solution over the course of 3 hours, with agitation. Under these conditions, the lignin sulfonic acid forms a salt with the free amino groups pendant on the polypeptide.

In yet another aspect of the invention, the appropriate vessel is charged with the desired amount of water with the 20 to 40 percent by weight of polypeptides having a molecular weight of 2,500 to 15,000 with a pH adjusted to 6.5 to 7. Alkylaryl sulfonic acid and the lignin sulfonic acids are charged thereto to form the salt of the sulfonic acid groups with the free amino groups on the polypeptide at the elevated temperature of 65° to 120° C., and preferably, 75° to 80° C.

As can be well recognized, it is necessary to combine the organic sulfonic acids and the polypeptides in aqueous solution to ensure intermixing and the formation of the appropriate orientation and ionic bonds between the two components.

While the surfactants which are formed as previously described are useful in a wide variety of areas such as surface active agents for the formation of aqueous emulsions or dispersions, for the dispersion of pigments and paint compositions, for the dispersion of insecticides, fungicides, herbicides, printing inks and the like, a particularly useful field is in forming disperse dyes.

It has been found that the surface active agents in accordance with the invention provide improved encapsulation of solid particles over prior art surface active agents. Thus, during grinding of pigments and dyes, when a particle is divided into smaller particles the surface active agent attracts such particle and such attraction is greater than the attraction to the particles themselves. The particles are thus encapsulated within the surface active agent and electrostatically bound thereto, thus forming a stable dispersion.

Typically, in forming the disperse dyes the appropriate amount of surface active agent is charged to a vessel and a press cake or dye cake is charged to the vessel, with stirring, at a temperature of about 65° to 120° C., and preferably 75° to 80° C. The mixture is agitated until it is apparently homogeneous. In the alternative, when the press cake of dye has low concentrations of pigment, i.e. less than 40 percent, dispersion of the dye is accomplished by charging the polypeptide at 20 to 40 percent by weight solids in water to the vessel with the subsequent addition of the dye at the above specified temperature, and finally, the addition of the organic sulfonic acid.

After the initial dispersion of the surface active agent, dye and water has been formed, the admixture is cooled to 20° to 25° C. The initial dye dispersion is milled by methods recognized by those skilled in the art. Typically, this milling is a continuous process where the mill is charged with a milling constituent such as sand or the like. The dispersion is continuously cycled through the vessel until the desired particle size is obtained, i.e. less than 2 microns and greater than 75 percent under 1 micron. After milling, a minor amount of bactericide or fungicide may be added as a preservative. The dye dispersion at this point may be used directly for dyeing of textile fibers, leathers or the like, or it may be dried to about 97 to 98 percent solids for packaging and subsequent use by dyers. The drying can be accomplished by spray drying or the like.

The dyes useful in the practice of the invention are those which are insoluble in water and are typically the nonionic disperse dyes which are described extensively in the patent literature and the Color Index. Included in such dyes are the azo, including azo methine, diazo and styryl azo, anthraquinone, diarylamine, methine, quinophthalone, acridone and naphthazarin dyes. These compounds are characterized by the absence of ionic groups such as sulfonate, which would render the compounds water soluble. Typical dyes according to their trade names are Artisil Blue BSG (D.Bl. 3), Artisil Scarlet G.P. (D.R. 1), Foron Rubin SE-GFL (D.R. 73), and Foron Navy S-2GL (D.B. 79). In addition to the dyes, inorganic pigments such as titanium dioxide and color pigments other than white may also be dispersed in accordance with the invention.

As is well recognized by those skilled in the art, other water insoluble materials in particulate form, such as herbicides, insecticides, fungicides, printing inks and the like may be dispersed in accordance with the invention.

Characteristically, the dried disperse dye compositions preferably have about 10 parts by weight to about 35 parts by weight of surface active agent solids per 100 parts by weight of dye solid particles. This is in contrast to prior art disperse dyes wherein the surfactant to dye ratio is upwards of 60 to 75 parts by weight total surfactant to 100 parts by weight of dried commercial dye.

The following examples will more fully illustrate the invention.

EXAMPLE 1

To a stainless steel mixing vessel equipped with a stirrer and having about 8,000 liters capacity are charged 450 kilograms of water and 560 kilograms of 20 percent aqueous solution of hydrolyzed collagen. The hydrolyzed collagen has an average molecular weight of about 10,000 in 20 percent aqueous solution. The pH of this admixture is adjusted with 50 percent aqueous sodium hydroxide to 6.5 to 7. The admixture is heated, with agitation, to 75° to 80° C. over 60 minutes. To the heated polypeptide solution are charged 400 kilograms of sodium lignin sulfonate while maintaining the temperature at 75° to 80° C. The sodium lignin sulfonate is charged in small increments with additional increments added as homogeneity is visually observed. The addition takes place over the course of about 3 hours while maintaining temperature at 75° to 80° C. The final pH of the surface active agent was about 7.5 The elevated temperature is required in order to orient the polypeptide and the sodium lignin sulfonate in the appropriate manner to act as a surface active agent.

3,950 kilograms of Artisil Blue BSG (D.Bl. 3) press cake dye are charged to the vessel over the course of about 3 hours, while maintaining the temperature at about 75° to 80° C., under agitation. The press cake contains 1,600 kilograms of solid pigment and 2,340 kilograms of water. Apparent homogeneity of the dispersion is achieved after agitation for 30 minutes at 75° to 80° C. The dispersion is then cooled to 20° to 25° C. A stainless steel dispersing mill having a capacity of 250 liters is charged with 320 kilograms of 20-30 mesh sand. 5,350 kilograms of the initial dispersion, which is about 30 percent pigment, are recycled on a continuous basis through the mill for 10 hours. After 10 hours of continuous milling, the average particle size of the dyed particles is under 1 micron and the particle size range is between about 0.3 and 1.2 microns. 55 kilograms of a 10 percent by weight solution of a preservative sold under the trade name Dowicide 75 are charged to the dispersion, with stirring. The dispersion is then spray dried, producing 2,170 kilograms of solids. The solids are 74 percent fine dispersed dye, 23 percent dispersing agent and 3 percent water. The dried dye can be delivered to dyers. The aqueous dispersion so produced can also be used, without drying, for dyeing directly. The aqueous colloidal dispersion contains 2,110 kilograms of solid component (39.5 percent by weight), about 1,600 kilograms of dye (about 30 percent by weight), 510 kilograms of the total surface active agent (about 9.5 percent by weight) and 3,240 kilograms of water.

EXAMPLES 2-4

Example 1 is repeated, except that the dyes utilized are Artisil Scarlet G.P. (D.R. 1); Foron Rubin SE-GFL (D.R. 73); and Foron Navy S-2GL (D.B. 79), respectively. The results of the dye dispersion of Examples 2 through 4 were the same as was previously reported in Example 1.

EXAMPLE 5

The procedure of Example 1 is repeated, except the following ingredients and amounts are utilized in the process: 700 kilograms of water, 280 kilograms of an aqueous solution of 40 percent by weight hydrolyzed collagen having an average molecular weight of 10,000 with a pH of 6.5 to 7,400 kilograms of sodium lignin sulfonate powder, 3,950 kilograms of press cake dye of Artisil Blue BSG (D.Bl. 3) having 1,600 kilograms of pigment therein, 320 kilograms of sand, and 55 kilograms of 10 percent Dowicide 75. The resultant aqueous dye dispersion after milling has an average particle size under 1 micron and a particle size range of 0.3 to 1.2 microns. The resultant dispersion is dried and the dry matter is about 74 percent by weight of dye. The aqueous colloidal dispersion prior to drying is about 30 percent dye. Upon testing, both the dried dye and the aqueous colloidal dispersion give excellent dyeing results on textile fibers and leather.

EXAMPLES 6–8

Example 5 is repeated, except for utilizing the following dyes in place of the Artisil Blue BSG: Artisil Scarlet G.P. (D.R. 1); Foron Rubin SE-GFL (D.R. 73); and Foron Navy S-2GL (D.B. 79). The results in Examples 6 through 8 are identical to those in Example 5.

EXAMPLE 9

The procedure of Example 1 is repeated, except using the following ingredients and amounts: 500 kilograms of water, 400 kilograms of an aqueous solution of 20 percent by weight hydrolyzed collagen having an average molecular weight of 10,000 and adjusted to a pH of 6.5 to 7,640 kilograms of sodium lignin sulfonate powder, 5,000 kilograms of press cake dye of Artisil Blue BSG (D.Bl. 3) having 2,000 kilograms of pigment therein, 320 kilograms of sand, and 55 kilograms of preservative Dowicide 75 as a 10 percent solution. The initial suspension recycled through the mill has about 30.3 percent dye, and upon drying, yields 2,805 kilograms of dried fine dispersed dye with about 71.5 percent dye, 3 percent water, and about 25.5 percent total surface active agent. Prior to drying, the aqueous colloidal dispersion has an average particle size below 1 micron with a particle size range of 0.3 to 1.2 microns. The aqueous dispersion is about 30 percent dye with the balance being water and surface active agent. Both the redispersed dried dye and the aqueous dispersion prior to drying give excellent results on dyeing textile fibers and leather.

EXAMPLES 10–12

Example 9 is repeated, except that the following dyes are substituted for the Artisil Blue BSG: Artisil Scarlet G.P. (D.R. 1); Foron Rubin SE-GFL (D.R. 73); and Foron Navy S-2GL (D.B. 79). The results of Examples 10 through 12 are identical to those of Example 9.

EXAMPLE 13

Example 1 is repeated, except that the following amounts and ingredients are utilized: 500 kilograms of water, 500 kilograms of an aqueous solution of 20 percent by weight hydrolyzed collagen having an average molecular weight of 10,000 and an adjusted pH of 6.5 to 7,400 kilograms of sodium lignin sulfonate, 5,000 kilograms of press cake dye of Artisil Blue BSG (D.Bl. 3) having 2,000 kilograms of pigment therein, 320 grams of sand, and 55 kilograms of 10 percent aqueous Dowicide 75. After milling, the particle size of the dispersion is below 1 micron, average, and has a particle size range of 0.3 to 1.2 microns. The aqueous dispersion is about 30 percent dye. The dried dispersion contains about 78 percent dye, 3 percent water and about 19 percent total surface active agent. Both the dried dye and the aqueous dye dispersion give excellent dyeings on textile fibers and leather.

EXAMPLES 14–16

Example 13 is repeated, except that the Artisil Blue BSG is substituted with Artisil Scarlet G.P. (D.R. 1); Foron Rubin SE-GFL (D.R. 73); and Foron Navy S-2GL (D.B. 79). The results of Examples 14 through 16 are identical to those of Example 13.

EXAMPLE 17

To an 8,000 liter vessel equipped with a mixing capability are charged 450 kilograms of water, 375 kilograms of 30 percent by weight hydrolyzed collagen with an average molecular weight range of about 2,500 to about 15,000 and adjusted to a pH of 6.5 to 7 with 50 percent sodium hydroxide. The solution is heated to 75° to 80° C., and upon reaching temperature, 500 kilograms of 100 percent solids lignin sulfonic acids, obtained from the sodium salt thereof, are charged over the course of 3 hours. The lignin sulfonic acids formed salts with the free amino groups of the polypeptide. 3,950 kilograms of press cake having 1,600 kilograms of dye therein are added over 3 hours also at 75° to 80° C.

The surface active agent is utilized in forming disperse dye compositions in accordance with the procedures of the previous examples with the resultant disperse dye compositions providing excellent dyeing to textiles and leather.

EXAMPLE 18

To an appropriate vessel equipped with a mixing capability are charged 450 kilograms of water and 40 kilograms of an aqueous solution obtained from the reaction of hydrolyzed collagen having an average molecular weight range of 2,500 to 15,000 with dodecylbenzene sulfonic free acid. The ratio of hydrolyzed collagen to dodecylbenzene sulfonic acid is about 1:0.5 by weight. This product is the salt of the alkylaryl sulfonic acid and the free amino groups of the polypeptide. The charge is heated to 75° to 80° C., and 335 kilograms of 40 percent by weight hydrolyzed collagen having an average molecular weight of 10,000 are charged thereto. 350 kilograms of lignin sulfonic free acid are now added over 2 hours at 75° to 80° C. and the admixture is heated for 2 hours. 3,950 kilograms of press cake having 1,600 kilograms of pigment therein are charged to the surface active agent solution over the course of 3 hours at 75° to 80° C.

The surface active agent so produced, when used to disperse dye, produces a dispersed dye having properties comparable to those in the previous examples.

In accordance with the present invention, a surface active agent is provided which has superior dispersing properties for the production of water insoluble materials, and particularly, particulate water insoluble materials. More particularly, disperse dye compositions are provided which have fine dye particle sizes with minimal dispersing efforts due to the particular surface active agent.

Thus, although the invention has been described with reference to specific materials and specific methods, the invention is only to be limited so far as is set forth in the accompanying claims.

We claim:

1. A surface active agent comprising:
   lignin sulfonic acids and a polypeptide having a molecular weight of about 2,500 to about 15,000, wherein said polypeptide is present at a level of about 4% by weight to about 50% by weight and said lignin sulfonic acids are present at a level of about 50% by weight to about 96% by weight on a solids basis.

2. The surface active agent of claim 1 wherein said lignin sulfonic acids are present as the sodium salt of lignin sulfonic acids.

3. The surface active agent of claim 2 wherein said surface active agent has a pH of about 6 to about 8.

4. The surface active agent of claim 1 wherein said polypeptides are derived from collagen.

5. The surface active agent of claim 4 wherein said polypeptides are hydrolyzed collagen.

6. The surface active agent of claim 1 including an alkylaryl sulfonic free acid having 10 to 25 carbon atoms and wherein the lignin sulfonic acids are in the free acid form.

* * * * *